(12) United States Patent
Bleckert et al.

(10) Patent No.: US 8,787,867 B2
(45) Date of Patent: Jul. 22, 2014

(54) EMERGENCY CALL HANDLING (75) Inventors: Peter Bleckert, Uppsala (SE); Philip Hodges, Melbourne (AU); Fredrik Lindholm, Stockholm (SE); Hans Krister Mikael Sällberg, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 8 days.

(21) Appl. No.: 13/146,016

(22) PCT Filed: Jan. 27, 2009

(86) PCT No.: PCT/EP2009/050886
§ 371 (c)(1),
(2), (4) Date: Oct. 16, 2011

(87) PCT Pub. No.: WO2010/086012
PCT Pub. Date: Aug. 5, 2010

(65) Prior Publication Data
US 2012/0052832 A1 Mar. 1, 2012

(51) Int. Cl.
*H04M 11/04* (2006.01)
(52) U.S. Cl.
USPC ........ 455/404.1; 455/410; 455/411; 455/415; 455/435.1
(58) Field of Classification Search
USPC ........... 455/404.1, 410, 415, 435.1, 411, 425, 455/551, 552.1; 370/242
See application file for complete search history.

(56) References Cited

U.S. PATENT DOCUMENTS

| | | | |
|---|---|---|---|
| 6,957,060 B1 | 10/2005 | Sharp | |
| 2004/0203572 A1* | 10/2004 | Aerrabotu et al. | 455/404.1 |
| 2004/0203575 A1 | 10/2004 | Chin et al. | |
| 2007/0129057 A1* | 6/2007 | Xu et al. | 455/410 |
| 2008/0101553 A1* | 5/2008 | Goldman et al. | 379/45 |
| 2008/0214240 A1* | 9/2008 | Choi et al. | 455/558 |
| 2009/0325558 A1* | 12/2009 | Pridmore et al. | 455/415 |
| 2010/0035577 A1* | 2/2010 | Rager et al. | 455/411 |
| 2010/0124897 A1* | 5/2010 | Edge | 455/404.1 |

FOREIGN PATENT DOCUMENTS

| | | |
|---|---|---|
| CN | 101222676 A | 7/2008 |
| EP | 1 944 997 A | 7/2008 |
| EP | 1 944 997 A2 | 7/2008 |
| GB | 2 439 768 A | 1/2008 |

(Continued)

OTHER PUBLICATIONS

PCT International Search Report, mailed Oct. 28, 2009, in connection with International Application No. PCT/EP2009/050886.

(Continued)

*Primary Examiner* — Dinh P Nguyen
(74) *Attorney, Agent, or Firm* — Leffler Intellectual Property Law, PLLC (57) ABSTRACT

A user terminal for use with a communications system. The user terminal comprises a non-volatile memory and a subscriber identity authentication unit configured in use to communicate with a removable subscriber identity module and with said communications system in order to authenticate a subscriber identity stored in said subscriber identity module. A recording unit is provided for recording a used and authenticated subscriber identity in said non-volatile memory, while an emergency call initiation unit is configured to initiate an unauthenticated emergency call in the absence of a subscriber identity module, and to retrieve said used and authenticated subscriber identity from said non-volatile memory and to provide the retrieved subscriber identity to the communications system during the initiation.

17 Claims, 5 Drawing Sheets

(56) References Cited

FOREIGN PATENT DOCUMENTS

| JP | 2001250183 A | 9/2001 |
|----|--------------|--------|
| JP | 2003244284 A | 8/2003 |
| JP | 2003309667 A | 10/2003 |
| JP | 2006522549 A | 9/2006 |
| WO | 03/037026 A1 | 5/2003 |

OTHER PUBLICATIONS

PCT Written Opinion, mailed Oct. 28, 2009, in connection with International Application No. PCT/EP2009/050886.

International Preliminary Report on Patentability, mailed May 26, 2011, in connection with International Application No. PCT/EP2009/050886.

3GPP Technical Specification 23.228, V8.7.0 Technical Specification Group Services and System Aspects; IP Multimedia Subsystem (IMS); Stage 2 (Release 8), Dec. 2008.

3GPP Technical Specification 23.167, V8.2.0 Technical Specification Group Services and System Aspects; IP Multimedia Subsystem (IMS) emergency sessions (Release 8), Dec. 2008.

3GPP Technical Specification 24.229, V8.6.0 Technical Specification Group Core Network and Terminals; IP multimedia call control protocol based on Session Initiation Protocol (SIP) and Session Description Protocol (SDP); Stage 3 (Release 8), Dec. 2008.

Japanese Office Action, mailed Oct. 28, 2013, in connection with Japanese Patent Application No. 2011-546621, all pages (see Translation below).

Translation of Japanese Office Action, mailed Oct. 28, 2013, in connection with Japanese Patent Application No. 2011-546621, all pages.

Translation of Chinese Office Action, dated Aug. 2, 2013 in connection with counterpart Chinese Patent Application No. 200980155952.8, all pages.

\* cited by examiner

EMERGENCY CALL HANDLING

TECHNICAL FIELD

The present invention relates to a method and apparatus for handling emergency calls in a telecommunications network and more particularly to a method and apparatus for handling unauthenticated emergency calls.

BACKGROUND

In the context of a cellular telephone network, an unauthenticated mobile emergency call is an emergency call where the subscriber is not fully authenticated or registered. A call to a Public Safety Answering Point (PSAP), i.e. an emergency centre, where the subscriber's number is not visible, may also be considered an unauthenticated mobile emergency call. Such unauthenticated calls have been permitted in order to allow an emergency call to be made despite normal telephone services being unavailable to a particular user terminal. Examples of unauthenticated call cases include:
- A call is placed before the user has logged into the network, e.g. a user makes an emergency call prior to entering a PIN code (to unlock a phone or SIM lock) by dialing 112 on a terminal. In this case, the user may or may not be the owner of the phone.
- A user has a valid subscription but his operator does not have a roaming agreement with the operator the user is camping on. An example can be when the user is in an area where only his operator's competitor has coverage, or when a user is travelling abroad.
- The user has had his subscription barred for normal calls. This could be the case, for example, when the user has not paid his bills or is out of cash on his pre-paid card.
- A user terminal does not have a Universal Integrated Circuit Card (UICC) with credentials for authentication (e.g. SIM or USIM application). This is the case in the clear majority of unauthenticated emergency calls.

Taking Sweden as an example, the number of unauthenticated emergency calls in the year 2000 was of the order of 700000, contributing around 18% of all emergency calls from the mobile networks. Out of these 700000 unauthenticated calls, only 1.5% were made in respect of real emergencies. The possibility of making unauthenticated calls encourages hoax calls, as the callers can effectively remain anonymous. In some countries including the UK, network operators have inhibited unauthenticated calls on mobile networks in an attempt to reduce the number of hoax calls. Of course, this in turn prevents users from making valid emergency calls on those rare occasions when only an unauthenticated terminal is available.

Figure 1:
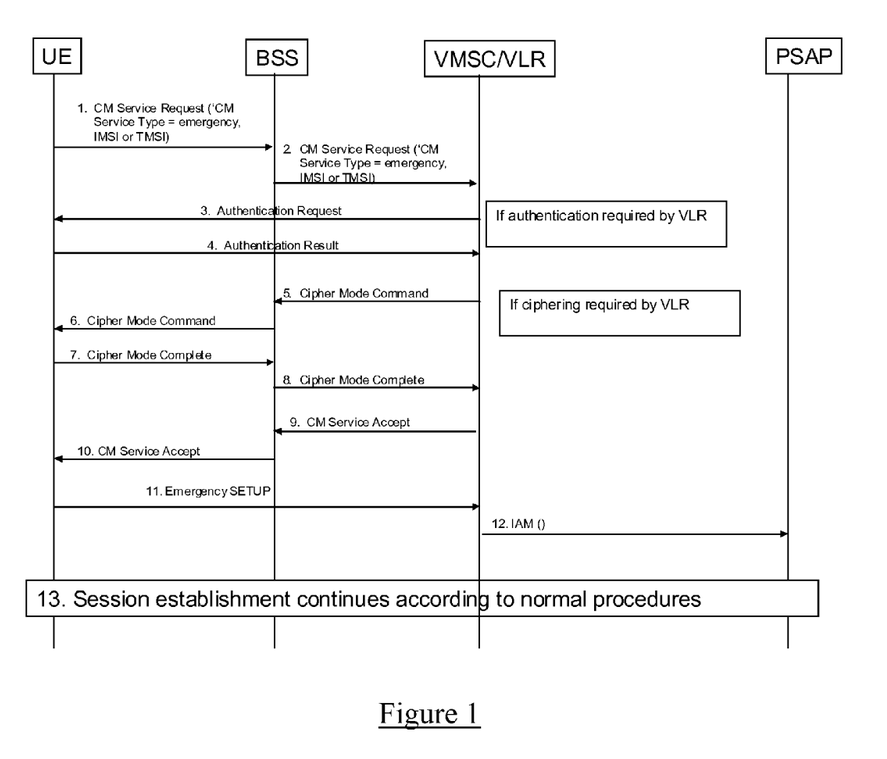
FIG. 1 shows a signalling flow associated with a prior art authenticated emergency call setup.

Current terminal and network implementations allow the terminal to omit the user identity (that is the International Mobile Subscriber Identity (IMSI) in the case of GSM/UMTS) in the emergency call setup if the credentials are missing. [NB. The IMSI is only available to the terminal if the UICC is present and unlocked.] Instead, the terminal will include an equipment identifier (such as the International Mobile Equipment Identifier (IMEI) number in the case of GSM/UMTS) in the call setup request. FIG. 1 shows a signalling flow associated with an emergency call where the SIM/USIM is assumed to be present in the user terminal and unlocked. If no SIM/USIM is present and unlocked, the authentication will fail, but the emergency call may continue. The IMEI will be included in the CM Service Request in place of the IMSI (or TMSI).

In the case of IP Multimedia Subsystem (IMS) [which is a 3GPP initiative to provide rich, multimedia services over 3G and other networks and utilises Session Initiation Protocol (SIP) signalling between client based SIP User Agents and IMS network nodes] unauthenticated emergency calls are described in 3GPP TS 23.167 and 3GPP TS 24.229. In short, the UE creates an anonymous emergency request, including the equipment identifier, and sends this to the P-CSCF within the IMS core. The P-CSCF checks that it is allowed to make an unauthenticated emergency call and, if so, forwards the request to the emergency CSCF (E-CSCF). Using a Location Retrieval Function (LRF), the E-CSCF finds the closest PSAP to route the call to. As with conventional Circuit Switched (CS) calls, users have the possibility to make anonymous hoax calls.

SUMMARY

It is an object of the present invention to mitigate the problems arising out of unauthenticated calls in telecommunication networks. At least according to one aspect, this is achieved by storing authenticated user identities within user terminals such that the identities are available even after removal of a UICC.

According to a first aspect of the present invention there is provided a user terminal for use with a communications system. The user terminal comprises a non-volatile memory and a subscriber identity authentication unit configured in use to communicate with a removable subscriber identity module and with said communications system in order to authenticate a subscriber identity stored in said subscriber identity module. A recording unit is provided for recording a used and authenticated subscriber identity in said non-volatile memory, whilst an emergency call initiation unit is configured to initiate an unauthenticated emergency call in the absence of a subscriber identity module, and to retrieve said used and authenticated subscriber identity from said non-volatile memory and to provide the retrieved subscriber identity to the communications system during the initiation.

Embodiments of the present invention may provide operators and authorities with a mechanism to trace users responsible for hoax and malicious unauthenticated emergency calls.

The recording unit may be arranged to securely store said authenticated subscriber identity in said non-volatile memory such that a terminal user is unable to alter the identity. Further, said emergency call initiation unit may configured to certify as authentic, a subscriber identity provided to the communications system.

The invention is applicable to wireless, cellular communication user terminals, in which case said subscriber identity authentication unit may be configured to operate in accordance with one of the GSM, EPS, and UMTS standards, with said subscriber identity being an IMSI identity. Said emergency call initiation unit may be configured to initiate a Circuit Switched emergency call, and to provide said authenticated subscriber identity with a CM Service Request.

The emergency call initiation unit may be configured to initiate a Circuit Switched emergency call, and to provide said authenticated subscriber identity with an Emergency SETUP request. Alternatively, said emergency call initiation unit may be configured to initiate an IMS emergency call, and to provide said authenticated subscriber identity within an emergency call INVITE.

In order to provide additional information, said emergency call initiation unit may be configured to provide to the communications system, in addition to said authenticated subscriber identity, a user terminal identity. The user terminal identity may be an IMEI identity.

The invention is applicable to a user terminal configured to operate as an EDATA or eCall terminal.

The recording unit may be configured to record in said non-volatile memory a plurality of used and authenticated subscriber identities, with said emergency call initiation unit being configured to retrieve this plurality of identities and provide them to the communications system during an emergency call initiation procedure.

According to a second aspect of the present invention there is provided a user terminal for use with a communications system. The terminal comprises a non-volatile memory and a subscriber identity authentication unit configured in use to communicate with a removable subscriber identity module and with said communications system in order to authenticate a subscriber identity stored in said subscriber identity module. The terminal further comprises a recording unit for recording in said non-volatile memory, details of unauthenticated emergency calls made from the terminal in the absence of a subscriber identity module, and a data handling unit configured, following re-installation of a subscriber identity module into the user terminal and at or following authentication of a subscriber to said system, to retrieve any emergency call details from said non-volatile memory, and to provide these to said system.

According to a third aspect of the present invention there is provided apparatus for use in a communication system and configured in use to receive from a user terminal an unauthenticated emergency call request, to retrieve from that request a previously used and authenticated subscriber identity, and to store that identity.

This apparatus may be one of a Visited MSC for use in a GSM/UMTS network, a Call Session Control Function node of an IP Multimedia Subsystem, and a Location Registration Function of an IP Multimedia Subsystem.

According to a fourth aspect of the present invention there is provided method of handling unauthenticated emergency calls in a communication system that requires authentication of subscriber identities for non-emergency calls. The method comprises, upon authentication of a subscriber identity stored on a subscriber identity module installed in a user terminal, storing the subscriber identity in a non-volatile memory of the user terminal outside of said subscriber identity module. Following removal of the subscriber identity module from the user terminal, an unauthenticated emergency call is initiated from the terminal. The used and authenticated subscriber identity is retrieved from said non-volatile memory and provided to the communications system during the initiation.

This method may comprise including the used and authenticated subscriber identity in one of a CM Service Request, Emergency SETUP, and an IMS emergency INVITE.

The method may be employed in one of a GSM, EPS, or UMTS communication system, with said subscriber identity being an IMSI.

According to a fifth aspect of the present invention there is provided method of handling unauthenticated emergency calls in a communication system that requires authentication of subscriber identities for non-emergency calls. The method comprises, following removal of a subscriber identity module from a user terminal, storing within a non-volatile memory of the terminal, details of unauthenticated emergency calls made from the terminal in the absence of the subscriber identity module. Following re-installation of a subscriber identity module into the user terminal and at or following authentication of a subscriber to said system, any emergency call details are retrieved from said non-volatile memory, and provided to said system.

DETAILED DESCRIPTION

The absence of a Universal Integrated Circuit Card (UICC) in a mobile user terminal or user equipment (UE) may prevent an operator and/or relevant authority from determining with absolute certainty the identity of the subscriber with whom the UE is associated. However, tracing of a subscriber or user may be possible if the operator/authority can obtain some information on the use history of the UE.

Considering a first solution to the problems discussed above, a UE, when used with a "new" UICC, may store the subscriber's identity, that is the IMSI, in a non-volatile memory of the UE after authentication of the subscriber by the network. That is to say that the IMSI is stored in a memory outside of the UICC itself. The information is readable by the UE even if the UICC is removed and is included as a new parameter in the emergency call set-up request, together with the equipment identifier, IMEI, for unauthenticated emergency calls. Even though the subscriber's identity will not be authenticated by the network for the purpose of the emergency call, it may be useful to the operator/authority in tracing a hoax emergency call. The network operator may for example "punish" the subscriber by preventing subsequent, authorised attachment of the subscriber to the network for some period of time.

Figure 2:
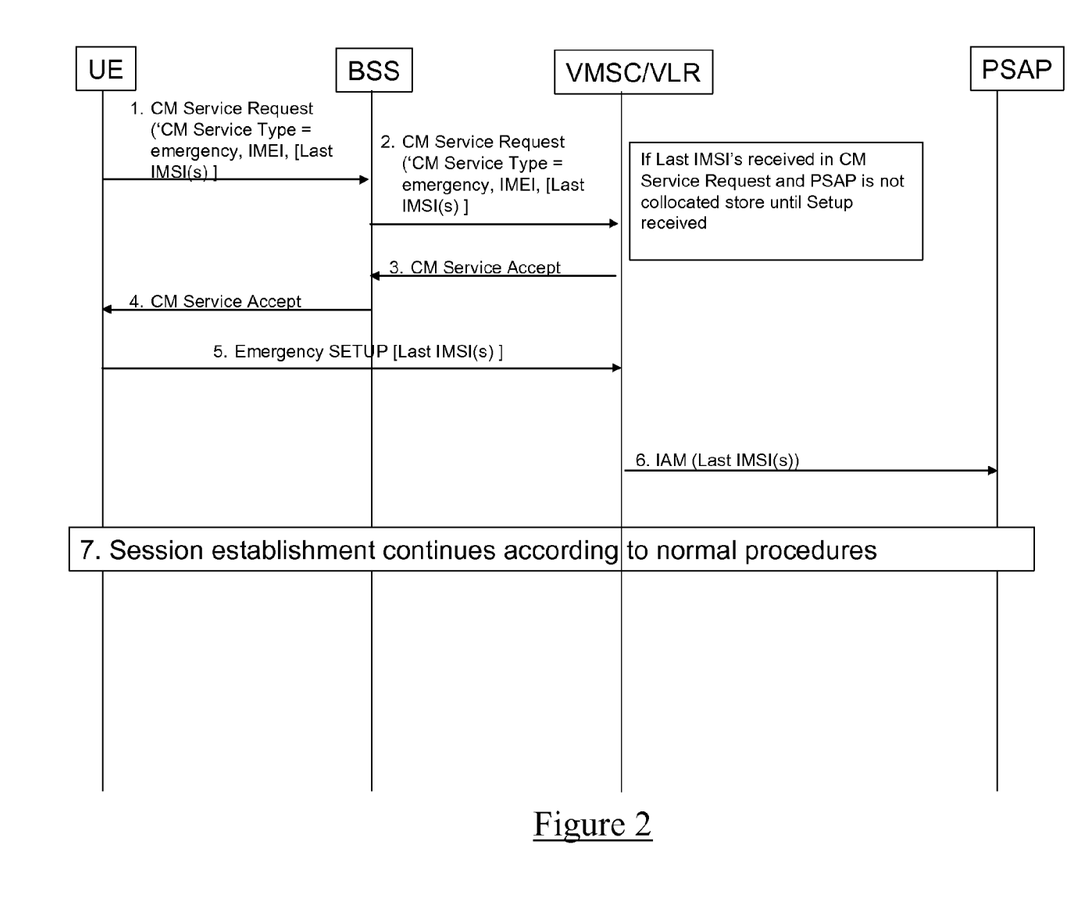
FIG. 2 shows a signalling flow associated with an unauthenticated emergency call setup in a CS case, and employing an embodiment of the present invention.

Considering firstly the Circuit Switched (CS) call case, if a user tries to make an unauthenticated CS emergency call then the UE shall include the old IMSI, retrieved from the non-volatile memory, as well as IMEI in the CM Service Request. In the case where multiple IMSIs are stored in the non-volatile memory, it is possible to include the list of IMSIs in the CM Service Request or the Emergency Setup. FIG. 2 shows the signalling flow associated with this case, identifying the following steps:

1. The UE sends a CM Service Request for an emergency call. The current standard requires the IMEI to be sent if no USIM is available. A previously used IMSI, or list of previously used IMSIs, is included.
2. The CM Service Request is received (via Complete L3 Information) by the visited MSC (VMSC). If a previously used IMSI (or IMSIs) is received, then the VMSC stores these until call establishment proceeds.
3. The emergency SETUP may contain a previously used IMSI (or list of previously used IMSIs), i.e. as an alternative to including the IMSI in the CM Service Request. The VMSC may include these as additional Informational Elements (IEs) in the NNI Call Control message to the PSAP. [Note that in FIG. 2, an ISUP IAM is shown. However, other call control protocols such as BICC and SIP-I can be used instead.] Extension of the call control protocol is assumed to allow this new functionality.

Note: extensions to ISUP may be made via a new ISUP parameter or via a new APM. If BICC is used as the call control protocol, then the BICC APM (ITU-T Q.765.5) could be extended.

Figure 3:
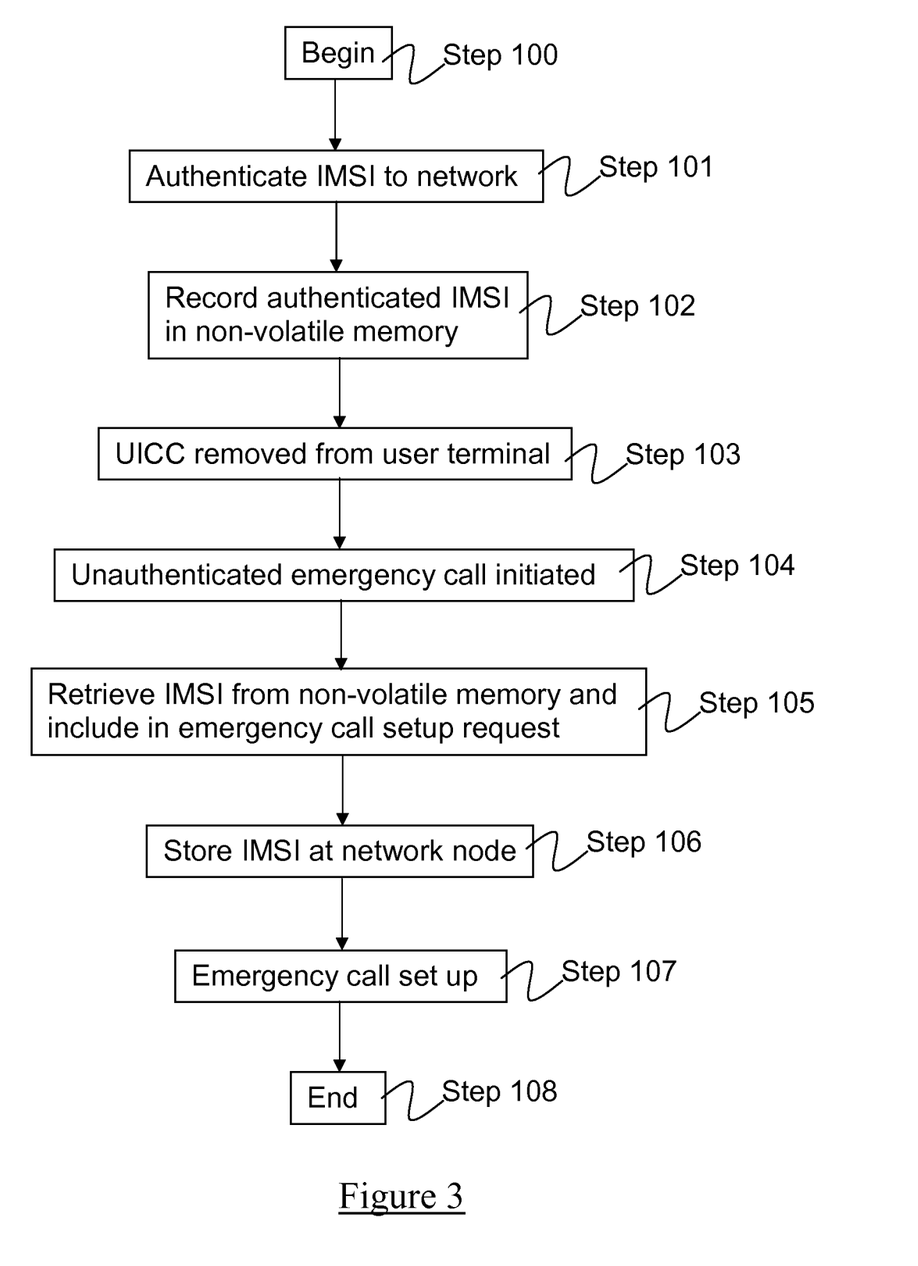
FIG. 3 is a flow diagram illustrating a procedure for recording used an authenticated IMSIs and for providing these to a network during unauthenticated emergency call setup.

FIG. 3 is a flow diagram further detailing the key steps in the process. This begins at step 100, where it is assumed that a valid UICC card with SIM/USIM is installed in the UE. The SIM is authenticated at step 101, and at step 102 the UE records the authenticated IMSI in the non-volatile memory. At step 103, a user removes the UICC. Thereafter, he or she is prevented from making non-emergency calls. At step 104, the user does indeed initiate an unauthenticated emergency call. In response, at step 105, the terminal retrieves the IMSI from the non-volatile memory and includes this in the unauthenticated emergency call setup request. The network stores the IMSI at step 107 for future reference (if necessary). The process ends at step 108.

Figure 4:
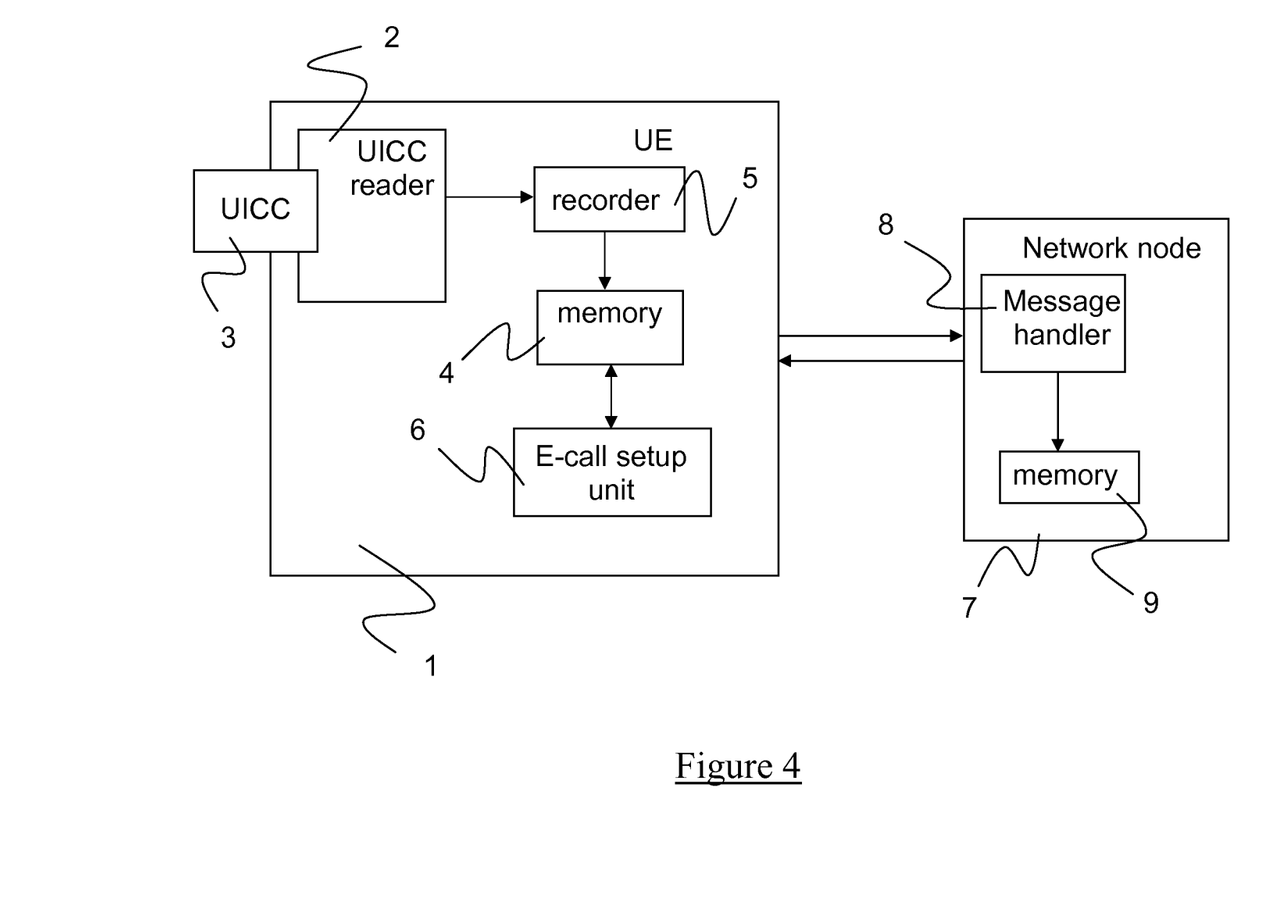
FIG. 4 illustrates schematically a user terminal and network node.

FIG. 4 illustrates both a UE 1 and a network node 7 of a GSM/UMTS network. The UE comprises a UICC card reader 2 for accepting and interacting with a UICC 3. The UE has a non-volatile memory 4 which may be a shared or dedicated memory. A recorder 5 handles the storage of used and authenticated IMSIs in the memory 4 as described above. An emergency call (E-call) setup unit 6 is responsible for establishing emergency calls with the network, and obtains an IMSI value (or IMSI list) from the memory 4 as and when required. The network node 7 has a message handler 8 for handing incoming CM service requests relating to emergency calls, and for extracting an IMSI or IMSI list from a message in the case that the call is unauthenticated. This is stored in a memory 9.

Figure 5:
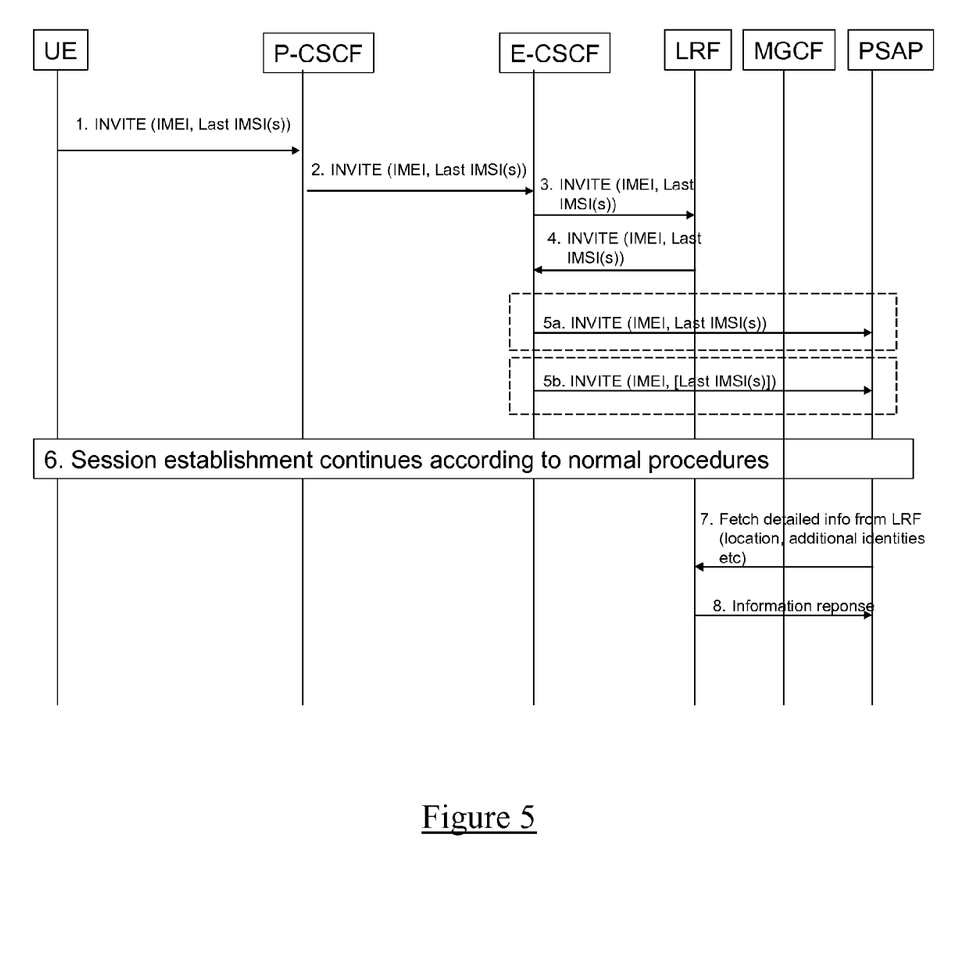
FIG. 5 shows a signalling flow associated with an unauthenticated emergency call setup in an IMS case, and employing an embodiment of the present invention.

Considering now IMS based unauthenticated emergency calls, if a user tries to make such a call then the UE shall include the retrieved, previously used IMSI as well as the equipment identifier (such as IMEI). FIG. 5 illustrates a possible usage scenario involving the following steps:

1. The UE creates an unauthenticated IMS emergency request (INVITE), including the IMEI and the last IMSI(s) used in the UE and retrieved from the non-volatile memory. The IMSI(s) may be either encoded in a new header, or transported in an existing header such as the P-Preferred-Identity header. The advantage of using a new header is that systems not supporting the feature (i.e. legacy systems) would safely ignore the extra identities.
2. The P-CSCF forwards the unauthenticated IMS emergency request to the E-CSCF.
3. The E-CSCF may invoke the LRF to retrieve the location of the PSAP closest to the UE.
4. The LRF may, based on the IMEI, locate the UE and determine the nearest PSAP, and return the route to the E-CSCF. In addition, the LRF may store the IMEI and the IMSI(s) received for later queries from the PSAP.
5. Depending on whether the PSAP is reached directly via IMS (a so-called IP-based PSAP) or whether it is located in the CS domain, different behaviours may be provided:
    a. In the event of an IP-based PSAP, the E-CSCF routes the unauthenticated IMS emergency request directly towards the PSAP. In this case, it could be expected that the PSAP will understand the extra information elements with the extra IMSI(s) included. The PSAP could then directly use the IMSI.
    b. In the event of a CS PSAP, the E-CSCF routes the call to the MGCF that provides the breakout to the CS domain. In this case it may not be possible to provide the extra identities to the PSAP. However, this could be overcome by either adding extra information elements to the ISUP messages including the IMSI(s), or ensuring that the IMSI(s) can be provided later (see step 7).
6. The call setup is completed according to normal procedures.
7. As an optional step, the PSAP can use the special interface "Le" to retrieve information about the provided caller. When doing so, it could request to retrieve the additional identities from the LRF, stored at step 4.
8. The LRF provides the requested information, including the IMSI(s), to the PSAP.

It will be appreciated that for other systems such as 3GPP2, rather than using an IMSI to identify a subscriber, other identifiers can be used such as the MIN or IRM (see 3GPP TS 23.228, "IP Multimedia Subsystem (IMS)", and in particular Annex L.6.1).

In order to prevent or at least minimise the risk of a user tampering with a stored, previously used IMSI (or IMSIs), the UE preferably has a mechanism for securely storing the IMSI(s) in the non-volatile memory. Further, the UE may have a mechanism for certifying the IMSI(s) prior to sending this to the network in such a way that the network can authenticate the IMSI(s) as genuine. Certain UEs already include a trusted module, that can include certificates and other security credentials tied to the UE as such, and not to the user. Such certificates could then be used to sign the IMSI(s) prior to sending these in the emergency request.

As an alternative to storing an IMSI or list of IMSIs (or other subscriber identities), a UE may store other information useful in identifying a malicious user. For example, a UE may log all emergency calls made from the UE together with relevant data such as time, length of call, position (if GPS available) etc. Data would then be available to a management authority through OMA DM or equivalent, and could be fetched by the network once a UICC is again available to the UE.

The approaches described here are equally applicable to Emergency DATA (EDATA) type services. EDATA, also known as "eCall", is a service designed for motor vehicles such that, upon deployment of an airbag or in a similar emergency situation, an emergency alert is automatically relayed to an emergency service. EDATA is similarly vulnerable to unauthorised emergency calls. By allowing the EDATA in-car module to include a previously used and stored IMSI or the like in the emergency call set-up request, the likelihood of hoax calls is reduced.

It will be appreciated by the person of skill in the art that various modifications may be made to the above described embodiments without departing from the scope of the present invention. For example, whilst the approach has been described with respect to GSM and UMTS, it is also applicable to Enhanced Packet System (EPS) networks.

The invention claimed is:

1. A user terminal for use with a communications system, the user terminal comprising:
    a non-volatile memory; a subscriber identity authentication unit configured in use to communicate with a removable subscriber identity module and with said communications system in order to authenticate a subscriber identity stored in said subscriber identity module;

a recording unit for recording a used and authenticated subscriber identity in said non-volatile memory; and an emergency call initiation unit configured to initiate an unauthenticated emergency call in the absence of a subscriber identity module, to provide a user terminal identity in place of the subscriber identity in a call setup request during the initiation, and to retrieve said used and authenticated subscriber identity from said non-volatile memory and to provide the retrieved subscriber identity to the communications system during the initiation, wherein the unauthenticated emergency call is an emergency call in which a subscriber is not fully authenticated or registered, wherein said user terminal identity is an International Mobile Equipment Identifier (IMEI) identity.

2. A user terminal according to claim 1, wherein said recording unit is arranged to securely store said authenticated subscriber identity in said non-volatile memory such that a terminal user is unable to alter the identity.

3. A user terminal according to claim 2, wherein said emergency call initiation unit is configured to certify as authentic, a subscriber identity provided to the communications system.

4. A user terminal according to claim 1, the terminal being a wireless, cellular communication user terminal.

5. A user terminal according to claim 4, wherein said subscriber identity authentication unit is configured to operate in accordance with one of the Global System for Mobile Communication (GSM), Evolved Packet System (EPS), and Universal Mobile Telecommunications System (UMTS) standards, with said subscriber identity being an International Mobile Subscriber Identity (IMSI) identity.

6. A user terminal according to claim 5, wherein said emergency call initiation unit is configured to initiate a Circuit Switched emergency call, and to provide said authenticated subscriber identity with a Connection Manager (CM) Service Request.

7. A user terminal according to claim 5, wherein said emergency call initiation unit is configured to initiate a Circuit Switched emergency call, and to provide said authenticated subscriber identity with an Emergency SETUP request.

8. A user terminal according to claim 5, wherein said emergency call initiation unit is configured to initiate an Internet Protocol (IP) Multimedia Subsystem (IMS) emergency call, and to provide said authenticated subscriber identity within an emergency call INVITE.

9. A user terminal according to claim 1, the apparatus being configured to operate as an Emergency DATA (EDATA) or emergency Call (eCall) terminal.

10. A user terminal according to claim 1, wherein said recording unit is configured to record in said non-volatile memory a plurality of used and authenticated subscriber identities, and said emergency call initiation unit is configured to retrieve this plurality of identities and provide them to the communications system during an emergency call initiation procedure.

11. A user terminal for use with a communications system, the user terminal comprising:
a non-volatile memory;
a subscriber identity authentication unit configured in use to communicate with a removable subscriber identity module and with said communications system in order to authenticate a subscriber identity stored in said subscriber identity module;

a recording unit for recording in said non-volatile memory, details of unauthenticated emergency calls made from the terminal in the absence of a subscriber identity module; and a data handling unit configured, following re-installation of a subscriber identity module into the user terminal and at or following authentication of a subscriber to said system, to retrieve any emergency call details from said non-volatile memory, and to provide these to said system, wherein each of the unauthenticated emergency calls is an emergency call in which a subscriber is not fully authenticated or registered.

12. A method of handling unauthenticated emergency calls in a communication system that requires authentication of subscriber identities for non-emergency calls, the method comprising:

upon authentication of a subscriber identity stored on a subscriber identity module installed in a user terminal, storing the subscriber identity in a non-volatile memory of the user terminal outside of said subscriber identity module; and following removal of the subscriber identity module from the user terminal, initiating an unauthenticated emergency call from the terminal, providing a user terminal identity in place of the subscriber identity in a call setup request during the initiation, retrieving the used and authenticated subscriber identity from said non-volatile memory and providing this to the communications system during the initiation, wherein the unauthenticated emergency call is an emergency call in which a subscriber is not fully authenticated or registered, wherein said user terminal identity is an International Mobile Equipment Identifier (IMEI) identity.

13. The method according to claim 12, the method comprising including the used and authenticated subscriber identity in one of a Connection Manager (CM) Service Request, Emergency SETUP, and an Internet Protocol (IP) Multimedia Subsystem (IMS) emergency INVITE.

14. The method according to claim 13, wherein said communication system is a Global System for Mobile Communication (GSM), Evolved Packet System (EPS), and Universal Mobile Telecommunications System (UMTS) system, and said subscriber identity is an International Mobile Subscriber Identity (IMSI).

15. A method of handling unauthenticated emergency calls in a communication system that requires authentication of subscriber identities for non-emergency calls, the method comprising:

following removal of a subscriber identity module from a user terminal, storing within a non-volatile memory of the terminal, details of unauthenticated emergency calls made from the terminal in the absence of the subscriber identity module; and following re-installation of a subscriber identity module into the user terminal and at or following authentication of a subscriber to said system, retrieving any emergency call details from said non-volatile memory, and providing these to said system, wherein each of the unauthenticated emergency calls is an emergency call in which a subscriber is not fully authenticated or registered.

16. The method of claim 15, wherein the emergency call details include one or more of a subscriber identity, a time of an unauthenticated emergency call, a length of an unauthenticated emergency call, and a geographical position at which an unauthenticated emergency call was made.

17. The user terminal of claim 11, wherein the emergency call details include one or more of a subscriber identity, a time of an unauthenticated emergency call, a length of an unauthenticated emergency call, and a geographical position at which an unauthenticated emergency call was made.

\* \* \* \* \*

UNITED STATES PATENT AND TRADEMARK OFFICE
CERTIFICATE OF CORRECTION

PATENT NO.          : 8,787,867 B2                                             Page 1 of 1
APPLICATION NO.     : 13/146016
DATED               : July 22, 2014
INVENTOR(S)         : Bleckert et al.

It is certified that error appears in the above-identified patent and that said Letters Patent is hereby corrected as shown below:

In the Claims

In Column 7, Line 18, in Claim 2, delete "A user" and insert -- The user --, therefor.

In Column 7, Line 22, in Claim 3, delete "A user" and insert -- The user --, therefor.

In Column 7, Line 25, in Claim 4, delete "A user" and insert -- The user --, therefor.

In Column 7, Line 27, in Claim 5, delete "A user" and insert -- The user --, therefor.

In Column 7, Line 34, in Claim 6, delete "A user" and insert -- The user --, therefor.

In Column 7, Line 40, in Claim 7, delete "A user" and insert -- The user --, therefor.

In Column 7, Line 44, in Claim 8, delete "A user" and insert -- The user --, therefor.

In Column 7, Line 49, in Claim 9, delete "A user" and insert -- The user --, therefor.

In Column 7, Line 52, in Claim 10, delete "A user" and insert -- The user --, therefor.

Signed and Sealed this
Nineteenth Day of May, 2015

Michelle K. Lee
*Director of the United States Patent and Trademark Office*